US012799270B2

(12) United States Patent
Park et al.

(10) Patent No.: US 12,799,270 B2
(45) Date of Patent: Nov. 17, 2026

(54) METHOD FOR PREPARING POLYLACTIC ACID POLYMER

(71) Applicant: LG CHEM, LTD., Seoul (KR)

(72) Inventors: Si Jung Park, Daejeon (KR); Wonseok Kim, Daejeon (KR); Wan Kyu Oh, Daejeon (KR); Yujin An, Daejeon (KR); Won Hee Woo, Daejeon (KR); Hyunchul Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 480 days.

(21) Appl. No.: 18/568,575

(22) PCT Filed: Jun. 21, 2022

(86) PCT No.: PCT/KR2022/008774
§ 371 (c)(1),
(2) Date: Dec. 8, 2023

(87) PCT Pub. No.: WO2022/270869
PCT Pub. Date: Dec. 29, 2022

(65) Prior Publication Data

US 2024/0409682 A1 Dec. 12, 2024

(30) Foreign Application Priority Data

Jun. 22, 2021 (KR) ........................ 10-2021-0080925

(51) Int. Cl.
*C08G 63/08* (2006.01)
*C08G 63/82* (2006.01)
*C08G 63/87* (2006.01)

(52) U.S. Cl.
CPC ........... *C08G 63/08* (2013.01); *C08G 63/823* (2013.01); *C08G 63/87* (2013.01)

(58) Field of Classification Search
None
See application file for complete search history.

(56) References Cited

U.S. PATENT DOCUMENTS 5,338,822 A 8/1994 Gruber et al.
6,353,086 B1 3/2002 Kolstad et al.
9,234,075 B2 * 1/2016 Lee ...................... C08G 63/823
2010/0249362 A1 9/2010 Kamikawa et al.
2010/0317797 A1 12/2010 Rafler et al.
2011/0319588 A1 12/2011 Coupin et al.
2012/0289675 A1 11/2012 Yoon et al.
2013/0267675 A1 10/2013 Yoshida
2014/0213752 A1 7/2014 Sohn et al.
2015/0225501 A1 8/2015 Lee et al.

FOREIGN PATENT DOCUMENTS

| | | | |
|---|---|---|---|
| CN | 1299393 | A | 6/2001 |
| CN | 101921468 | * | 12/2010 |
| CN | 101921468 | A | 12/2010 |
| CN | 103788347 | A | 5/2014 |
| CN | 105504237 | A | 4/2016 |
| CN | 109836614 | A | 6/2019 |
| JP | S57190020 | A | 11/1982 |
| JP | H08-239347 | A | 9/1996 |
| JP | H09-031171 | A | 2/1997 |
| JP | 2862071 | B2 | 2/1999 |
| JP | 2002-322249 | A | 11/2002 |
| JP | 2009-114353 | A | 5/2009 |
| JP | 2010-070588 | A | 4/2010 |
| JP | 2012046607 | A | 3/2012 |
| JP | 2012-515245 | A | 7/2012 |
| JP | 2013514427 | A | 4/2013 |
| JP | 2013-536285 | A | 9/2013 |
| JP | 5611234 | B2 | 10/2014 |
| JP | 2015524873 | A | 8/2015 |
| KR | 10-2189677 | B1 | 12/2020 |

OTHER PUBLICATIONS

Chen et al., "Improving the ring-opening polymerization of epsilon-caprolactone and L-lactide using stannous octanoate," Polym. Bull. 70: 993-1001 (2013), DOI 10.1007/s00289-012-0864-1.
Degée et al., "Beneficial Effect of Triphenylphosphine on the Bulk Polymerization of L,L-Lactide Promoted by 2-Ethylhexanoic Acid Tin (II) Salt," Journal of Polymer Science Part A: Polymer Chemistry 37: 2413-2420 (1999).

* cited by examiner

*Primary Examiner* — Tae H Yoon
(74) *Attorney, Agent, or Firm* — Bryan Cave Leighton Paisner LLP

(57) ABSTRACT

A method for preparing a polylactic acid polymer excellent in color characteristics while having high molecular weight by using a combination of a tin-based catalyst and a phosphinite-based cocatalyst in a ring-opening polymerization reaction of a polylactic acid oligomer.

11 Claims, No Drawings

METHOD FOR PREPARING POLYLACTIC ACID POLYMER

CROSS-REFERENCE TO RELATED APPLICATION(S)

This application is a National Stage Application of International Application No. PCT/KR2022/008774 filed on Jun. 21, 2022, which claims the benefit of Korean Patent Application No. 10-2021-0080925 filed on Jun. 22, 2021 with the Korean Intellectual Property Office, the content of which is incorporated herein by reference in its entirety.

TECHNICAL FIELD

The present disclosure relates to a method for preparing a polylactic acid polymer, and more particularly, to a method for preparing a polylactic acid polymer excellent in color characteristics while having high molecular weight by using a combination of specific catalysts in the ring-opening polymerization reaction of polylactic acid oligomer.

BACKGROUND ART

Polylactic acid (PLA) is a plant-derived resin obtained from plants such as corn, and is attracting attention as an environmentally friendly material having biodegradable characteristics.

Unlike petroleum-based resins conventionally used, such as polystyrene resin, polyvinyl chloride resin and polyethylene, polylactic acid has effects such as prevention of depletion of petroleum resources and suppression of carbon dioxide emission, and thus can reduce an environmental pollution, which is a disadvantage of petroleum-based plastic products. Therefore, as the problem of environmental pollution caused by waste plastics has emerged as a social problem, efforts are being made to expand the scope of application up to product fields where general plastics (petroleum-based resins) were used, such as food packaging materials, containers, and electronic product cases.

Meanwhile, polylactic acid is produced by polymerizing lactic acid produced by microbial fermentation, but direct polymerization of lactic acid produces only low molecular weight polymers. In order to synthesize high molecular weight polylactic acid, a method of polymerizing polylactic acid with a higher molecular weight using a chain coupling agent from polylactic acid with a low molecular weight obtained by direct polymerization of lactic acid is known, but there are disadvantages in that the process is complicated, a coupling agent and an organic solvent are used together, and thus, their removal is not easy.

In the production process of high-molecular-weight polylactic acid commercialized at present, a chemical synthesis method of converting lactic acid into lactide and synthesizing polylactic acid through a ring-opening reaction of the lactide ring is used. However, even in this case, there is a problem that it is difficult to achieve a high molecular weight. Particularly, when the amount of $Sn(Oct)_2$ catalyst used to achieve a high molecular weight is increased, the conversion rate per hour increases, but the actual increase in molecular weight is not large, which rather adversely affects the color of the prepared resin. In addition, when the amount of catalyst is reduced due to concern about discoloration of the resin, there is a problem that the conversion rate relative to the same time is low, the polymerization requires a long time, and the molecular weight is slightly reduced.

Therefore, there is a need to develop a method for preparing a polylactic acid polymer that has excellent physical properties and can easily attain increased high molecular weight so that it can be applied to various industries.

BRIEF DESCRIPTION

Technical Problem

It is an object of the present disclosure to provide a method for preparing a polylactic acid polymer excellent in color characteristics while having high molecular weight by using a combination of specific catalysts in the ring-opening polymerization reaction of polylactic acid oligomer.

Technical Solution

In order to achieve the above object, according to the present disclosure, provided is a method for preparing a polylactic acid polymer, which comprises performing a ring-opening polymerization of lactide in the presence of a tin-based catalyst and a phosphinite-based cocatalyst to prepare a polylactic acid polymer.

Unless particularly mentioned herein, the term “including” or “comprising” refers to including some element (or component) without any limitation, and should not be construed as excluding addition of other elements (or components).

(Method for Preparing Polylactic Acid Polymer)

In the production process for high molecular weight polylactic acid commercialized at present, a chemical synthesis method of converting lactic acid into lactide and synthesizing polylactic acid through a ring-opening reaction of a lactide ring is used. However, there is a problem that it is difficult to achieve a high molecular weight suitable for commercialization. When the amount of $Sn(Oct)_2$ catalyst used to achieve a high molecular weight is increased, the conversion rate per hour increases, but the actual increase in molecular weight is not large, which rather adversely affects the color of the prepared resin. In addition, when the amount of catalyst is reduced due to concern about discoloration of the resin, there is a problem that the conversion rate relative to the same time is low, the polymerization requires a long time, and the molecular weight is slightly reduced.

Therefore, the present inventors have found that a polylactic acid polymer excellent in color characteristics while having a high molecular weight, and improved in polymerization rate, can be easily prepared by using a combination of specific catalysts in the ring-opening polymerization reaction of lactic acid oligomer, thereby completing the present disclosure.

It has been found that by using a phosphinite-based cocatalyst together with a tin-based catalyst used in the conventional ring-opening polymerization reaction, the reaction conversion is remarkably improved, and it is easy to achieve a high molecular weight. Particularly, it has been found that the weight average molecular weight of the finally prepared polymer can be increased by about 15% or more as compared with other phosphorus-based cocatalyst compounds such as phosphine, which makes it easy to implement high molecular weight polymers.

DETAILED DESCRIPTION

Below, the present disclosure will be described in detail.

According to one embodiment of the present disclosure, the method includes performing a ring-opening polymerization of lactide to prepare a polylactic acid polymer.

The ring-opening polymerization is performed in the presence of a combination catalyst of a phosphinite-based cocatalyst with a tin-based catalyst, whereby the polymerization rate is sufficiently high as compared to the case of using a conventional tin-based catalyst alone, and the reaction conversion rate is remarkably improved, which makes it easy to achieve a high molecular weight. In addition, it is possible to reduce the amount of tin-based catalyst used during the reaction, which is thus economical, and the finally prepared polylactic acid polymer has no color change problem while maintaining environmental friendliness and biodegradability, which makes it easy to apply in various fields. Particularly, by using the combination catalyst, a polylactic acid polymer having a weight average molecular weight of about 400,000 or more, which molecular weight is very large, can be easily prepared through the ring-opening polymerization reaction.

In the ring-opening polymerization, the tin-based catalyst can be $Sn(Oct)_2$.

Further, in the ring opening, the phosphinite-based cocatalyst can be at least one selected from compounds of Chemical Formula 1:

$P(OR^1)(R^2)(R^3)$ [Chemical Formula 1]

wherein:

$R^1$ is a substituted or unsubstituted $C_{1-30}$ alkyl or a substituted or unsubstituted $C_{6-30}$ aryl; and $R^2$ and $R^3$ are each independently a substituted or unsubstituted $C_{1-30}$ alkyl or a substituted or unsubstituted $C_{6-30}$ aryl.

Preferably, $R^1$ is methyl, ethyl, propyl, isopropyl, phenyl, biphenylyl or naphthyl, more particularly, ethyl, propyl, isopropyl or phenyl.

Preferably, $R^2$ and $R^3$ are each independently methyl, ethyl, propyl, isopropyl, phenyl, biphenylyl or naphthyl, which are unsubstituted or substituted with methoxy, ethoxy, propoxy or isopropoxy. More preferably, they are ethyl, propyl, isopropyl or phenyl, wherein the phenyl can be unsubstituted or substituted with methoxy, ethoxy, propoxy or isopropoxy.

The phosphinite-based cocatalyst can be at least one selected from compounds of Chemical Formulas 1-1 to 1-3:

[Chemical Formula 1-1]

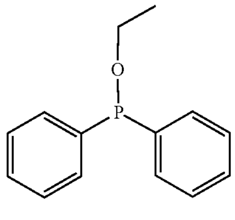

[Chemical Formula 1-2]

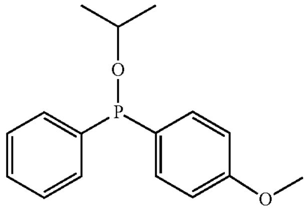

-continued

[Chemical Formula 1-3]

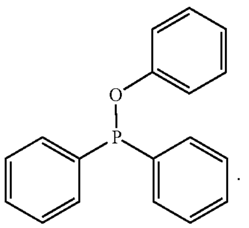

The tin-based catalyst and the phosphinite-based cocatalyst can be included in a molar ratio of 1:0.1 to 1:5. Within the above molar ratio range, the reaction conversion rate is remarkably improved, and it is easy to achieve a high molecular weight. More preferably, the tin-based catalyst and the phosphinite-based cocatalyst can be used at a molar ratio of 1:0.5 to 1:3, 1:0.8 to 1:2, or 1:0.9 to 1:1.5.

The tin-based catalyst can be included in an amount of 0.001 mol % to 0.05 mol % relative to the lactide content. Within the above range, the ring-opening polymerization can be promoted with high reactivity, it is used in a relatively small amount and thus is excellent in economic efficiency, and it does not cause a color change in the final polymer which is preferable. More preferably, the tin-based catalyst can be included in an amount of 0.0015 mol % to 0.03 mol %, 0.0015 mol % to 0.01 mol %, or 0.002 mol % to 0.01 mol % relative to the lactide content. In addition, by satisfying the above content range and, at the same time, satisfying the molar ratio range with the above-mentioned phosphinite-based cocatalyst, the excellent catalytic activity can be realized.

The phosphinite-based cocatalyst can be included in an amount of 0.001 mol % to 0.05 mol % relative to the lactide content, the condensation polymerization can be promoted with high reactivity within the above range, which is thus preferable. More preferably, the phosphinite-based cocatalyst can be included in an amount of 0.0015 mol % to 0.03 mol %, 0.0015 mol % to 0.01 mol %, or 0.002 mol % to 0.01 mol % relative to the lactide content. In addition, it is possible to satisfy the above-mentioned content range and, at the same time, satisfy the above-mentioned molar ratio range with the tin-based catalyst.

The ring-opening polymerization reaction can proceed by a bulk polymerization that does not substantially use a solvent. In this case, substantially no use of a solvent can encompass up to the case of using a small amount of solvent for dissolving the catalyst, for example, a solvent in an amount of less than 10 ml at maximum per total 1 kg of lactide used. As the ring-opening polymerization proceeds by a bulk polymerization, it is possible to omit the process for removing the solvent after polymerization, and decomposition or loss of resin in such a solvent removal process can also be suppressed. In addition, the bulk polymerization enables the polylactic acid polymer to be obtained with high conversion rate and yield.

The ring-opening polymerization can be performed at 150 °C to 200 °C and 0.5 bar to 2 bar for 30 minutes to 6 hours. Preferably, the reaction can be performed at 170 °C to 190 °C and at 0.7 bar to 1.5 bar for 1 hour to 3 hours. When the polymerization is performed under the above conditions, the conversion rate per time is high and thus, the polylactic acid polymer with a desired high molecular weight can be efficiently prepared, and the prepared polymer has little discoloration.

Meanwhile, the lactide can be prepared according to a method commonly used in the art, and a commercially available product can be used.

Commercially available products include L-lactide available from FORUSORB, L-lactide available from TCI, L-lactide available from Sigma-Aldrich, or L-lactide available from Acros Organics, but is not limited thereto.

Further, the lactide can be used as prepared through the following steps.

Specifically, the lactide can be prepared by including a step 1-1 of preparing lactic acid prepolymer by subjecting lactic acid to condensation polymerization and a step 1-2 of depolymerizing the low molecular weight lactic acid prepolymer prepared through the condensation polymerization reaction.

Here, the 'lactic acid' refers to L-lactic acid, D-lactic acid, or a mixture thereof.

The reaction conditions of each step are not particularly limited, and for example, the step 1-1 can be performed in the presence of a sulfonic acid-based catalyst and a tin-based catalyst, and preferably, the sulfonic acid-based catalyst is p-toluenesulfonic acid, m-xylene-4-sulfonic acid, 2-mesitylenesulfonic acid, or p-xylene-2-sulfonic acid. The tin-based catalyst is $SnCl_2$.

Further, in the step 1-1, the reaction can be performed at 150 °C to 200 °C for 110 minutes to 130 minutes, and then the reaction can be performed at 150 °C to 200 °C and 10 mbar to 30 mbar for 1 hour to 5 hours.

The step 1-2 can be performed in the presence of a tin-based catalyst. Preferably, the tin-based catalyst is $Sn(Oct)_2$.

Further, in the step 1-2, the reaction can be performed at 200 °C to 250 °C and 8 mbar to 12 mbar for 1 hour to 5 hours, and preferably, the reaction can be performed at 200 °C to 230 °C and 9 mbar to 11 mbar for 2 hours to 4 hours.

According to one embodiment of the disclosure, the preparation method has an excellent conversion rate by using two types of combination catalysts. By using the above-mentioned combination catalyst, a high molecular weight polylactic acid polymer can be prepared with a relatively short reaction time and/or excellent conversion rate even when using a small amount of catalyst.

Preferably, the preparation method exhibits a conversion rate of 75% or more, preferably, a high conversion rate of 75% to 99%, 75% to 97%, 80% or more, 90% or more, or 95% or more.

The conversion rate means the percentage of the reaction amount (number of moles) to the supply amount (number of moles) of lactide, and a specific method for measuring the conversion rate will be described in detail in the contents of Experimental Examples described later.

(Polylactic Acid Polymer)

According to one embodiment of the present disclosure, provided is a polylactic acid polymer prepared according to the above-described preparation method.

The weight average molecular weight (Mw) of the polylactic acid polymer can be 50,000 to 600,000, preferably, 100,000 to 500,000. By satisfying the above range, it is suitable for realizing the physical properties required for commercial applications such as packaging materials, films, fibers, and durable materials.

The number average molecular weight (Mn) of the polylactic acid polymer can be 25,000 to 300,000, preferably, 50,000 to 250,000.

The polydispersity index (PDI) of the polylactic acid polymer can be 1.0 to 3.0, preferably 1.5 to 2.5.

Methods for measuring the weight average molecular weight, the number average molecular weight, and the polydispersity index will be described in detail in Experimental Examples described later.

The polylactic acid polymer exhibits excellent color characteristics, and when Y.I. (yellow index) is measured in a transmission mode in the solution phase, which is the method presented herein, it has a value of 2.4 or less, preferably 2.35 or less, 2.15 or less, 2.0 or less, 1.7 or less, 1.5 or less, 1.0 to 2.4, or 1.0 to 2.35, 1.0 to 2.15, 1.0 to 2.0, 1.0 to 1.7, or 1.0 to 1.5.

(Article)

In addition, according to another embodiment of the present disclosure, provided is an article including the polylactic acid polymer.

The article can include a packaging material, a film, a nonwoven fabric, a fiber, a coffee capsule, a durable material, a cigarette filter, and the like, and it can be used to manufacture environmentally friendly products that are applied to the corresponding article and have excellent biodegradability and reduce $CO_2$ emission.

Advantageous Effects

As described above, the present disclosure provides a method for preparing a polylactic acid polymer excellent in color characteristics while having high molecular weight by using a combination of specific catalysts in the ring-opening polymerization reaction of polylactic acid oligomer.

In addition, the polylactic acid polymer has excellent color characteristics while maintaining environmental friendliness and biodegradability.

EXAMPLES

Hereinafter, embodiments of the present disclosure will be explained in detail with reference to examples. However, the following examples are for illustrative purposes only, and the detailed description of the present disclosure is not limited by these examples.

EXAMPLES AND COMPARATIVE EXAMPLES

Example 1

A magnetic stirrer and 1 g of L-lactide (FORUSORB) were put into a Schlenk Flask with a capacity of 20 mL, and catalyst $Sn(Oct)_2$ and cocatalyst ethyldiphenylphosphinite (EDP) were respectively added at 50 ppm mol relative to lactide (molar ratio of $Sn(Oct)_2$:EDP=1:1). The inside of the flask was placed in a vacuum and kept in an oil bath at 60 °C for 1 hour to remove solvents and impurities. Next, the temperature was raised to 180 °C under an Ar atmosphere and a normal pressure (1 bar), and subjected to a ring-opening polymerization reaction for 1 hour to prepare a polylactic acid polymer.

Example 2

A polylactic acid polymer was prepared in the same manner as in Example 1, except that the amount of the cocatalyst ethyldiphenylphosphinite (EDP) was used at 10 ppm mol (molar ratio of $Sn(Oct)_2$:EDP=1:0.2).

Example 3

A polylactic acid polymer was prepared in the same manner as in Example 1, except that isopropoxy(4-methoxy-phenyl)(phenyl)-phosphine was used at the same amount instead of the cocatalyst ethyldiphenylphosphinite (EDP) (molar ratio of $Sn(Oct)_2$:ipr-mppp=1:1).

Example 4

A polylactic acid polymer was prepared in the same manner as in Example 1, except that the reaction time was increased from 1 hour to 2 hours.

Example 5

A polylactic acid polymer was prepared in the same manner as in Example 1, except that the reaction time was increased from 1 hour to 3 hours.

Comparative Example 1

A polylactic acid polymer was prepared in the same manner as in Example 1, except that the cocatalyst EDP was not used.

Comparative Example 2

A polylactic acid polymer was prepared in the same manner as in Example 1, except that the cocatalyst EDP was not used and the reaction time was increased to 3 hours.

Comparative Example 3

A polylactic acid polymer was prepared in the same manner as in Example 1, except that the cocatalyst EDP was not used, the amount of $Sn(Oct)_2$ was increased to 100 ppm mol, and the reaction time was kept as long as 3 hours.

Comparative Example 4

A polylactic acid polymer was prepared in the same manner as in Example 1, except that triphenylphosphine was used at the same amount instead of the cocatalyst ethyldiphenylphosphinite (EDP).

Experimental Example

The characteristics of the polymers prepared in Examples and Comparative Examples were evaluated as follows, and the results are shown in Table 1 below.

1) Evaluation of Molecular Weight Characteristics

The weight average molecular weight, number average molecular weight, and polydispersity index of the polymers prepared in the Examples and Comparative Examples were measured by gel permeation chromatography (GPC, Tosoh ECO SEC Elite), and the results are shown in Table 1 below.

Solvent: Tetrahydrofuran (THF) (eluent)

Flow rate: 1.0 ml/min

Column temperature: 40 °C

Standard: Polystyrene (corrected by the cubic function)

2) Measurement of Conversion Rate

For the polymers prepared in Examples and Comparative Examples, the conversion rate, defined as a percentage of the reaction amount (number of moles) to the supply amount (number of moles) of lactide, was measured.

Specifically, nuclear magnetic resonance (NMR: Bruker 500 MHz solution NMR) was used, and 1H NMR was measured using $CDCl_3$ as a solvent. The conversion rate was measured by a method comparing the peak area integrations of PLA and lactide between 4.9 ppm and 5.2 ppm.

3) Evaluation of Color Characteristics

For the polymers prepared in Examples and Comparative Examples, residual lactide and moisture were removed, and dried in a vacuum oven at 135 °C for 24 hours in order to evaluate the color change characteristics. Next, 2 g of a polymer sample was dissolved in 40 ml of $CHCl_3$ and the Y.I. (yellow index) of the resin was measured using a transmission mode of Ultrascan VIS (HunterLab) equipment.

TABLE 1

| Category | Conversion rate (%) | Molecular weight Mn | Mw | PDI | Evaluation of color change Y.I. |
|---|---|---|---|---|---|
| Example 1 | 79.51 | 204,000 | 432,300 | 2.12 | 1.12 |
| Example 2 | 78.28 | 143,000 | 403,900 | 2.76 | 1.23 |
| Example 3 | 76.60 | 141,700 | 402,600 | 2.77 | 1.06 |
| Example 4 | 94.76 | 198,400 | 441,400 | 2.22 | 1.69 |
| Example 5 | 95.11 | 178,900 | 421,800 | 2.35 | 2.14 |
| Comparative Example 1 | 73.07 | 145,300 | 352,800 | 2.43 | 1.22 |
| Comparative Example 2 | 86.34 | 162,900 | 388,500 | 2.39 | 2.43 |
| Comparative Example 3 | 95.36 | 158,500 | 396,900 | 2.50 | 6.48 |
| Comparative Example 4 | 73.84 | 180,600 | 366,800 | 2.03 | 1.19 |

As can be seen in Table 1, it was confirmed that when the ring-opening polymerization of lactide was performed in the presence of two types of combination catalysts according to the present disclosure, a polymer having a weight average molecular weight of 400,000 or more while realizing a high conversion rate of about 75% or more could be prepared. Particularly, it could be confirmed that the color characteristics were improved.

It could be confirmed that in the case of Comparative Examples 1 to 3 in which only $Sn(Oct)_2$ was used instead of the two types of combination catalysts, it was difficult to prepare a polymer having a weight average molecular weight of 400,000 or more. Particularly, it could be confirmed that in the case of Comparative Example 1, there was no problem in color characteristics by using the same content of $Sn(Oct)_2$ as in Example 1, but conversion rate and molecular weight characteristics were significantly lowered as compared to the Examples.

It could be confirmed that in the case of Comparative Examples 2 and 3, the reaction time was increased, the amount of catalyst used was increased, and thus achieved the conversion rate at the same level as in the Examples, but even in this case, the degree of increase in molecular weight was low. Particularly, it could be confirmed that in the case of Comparative Example 3 in which the amount of $Sn(Oct)_2$ catalyst was increased, Y.I. significantly increased, and color characteristics were deteriorated.

On the other hand, it could be confirmed that in the case of Comparative Example 4, a phosphorus-based cocatalyst was used together with $Sn(Oct)_2$, but triphenylphosphine rather than the phosphinite-based catalyst of the present disclosure was used, whereby the conversion rate is lower than in the Examples, and particularly, it is difficult to obtain a polymer with a desired degree of high molecular weight.

The invention claimed is:

1. A method for preparing a polylactic acid polymer, which comprises:

performing a ring-opening polymerization of lactide in the presence of a tin-based catalyst and a phosphinite-based cocatalyst to prepare a polylactic acid polymer, wherein the polylactic acid polymer has a weight average molecular weight of 400,000 or more.

2. The method of claim 1, wherein:

the tin-based catalyst is $Sn(Oct)_2$.

3. The method of claim 1, wherein:

the phosphinite-based cocatalyst is at least one selected from compounds of Chemical Formula 1:

$P(OR^1)(R^2)(R^3)$ [Chemical Formula 1]

wherein:

$R^1$ is a substituted or unsubstituted $C_{1-30}$ alkyl or a substituted or unsubstituted $C_{6-30}$ aryl; and $R^2$ and $R^3$ are each independently a substituted or unsubstituted $C_{1-30}$ alkyl or a substituted or unsubstituted $C_{6-30}$ aryl.

4. The method of claim 3, wherein:

the $R^1$ is methyl, ethyl, propyl, isopropyl, phenyl, biphenylyl or naphthyl.

5. The method of claim 3, wherein:

$R^2$ and $R^3$ are each independently methyl, ethyl, propyl, isopropyl, phenyl, biphenylyl or naphthyl, which are unsubstituted or substituted with methoxy, ethoxy, propoxy or isopropoxy.

6. The method of claim 1, wherein:

the phosphinite-based cocatalyst is at least one selected from compounds of Chemical Formulas 1-1 to 1-3:

[Chemical Formula 1-1]

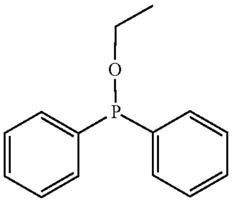

-continued

[Chemical Formula 1-2]

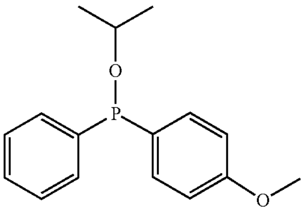

[Chemical Formula 1-3]

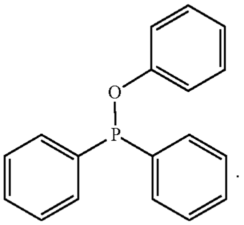

7. The method of claim 1, wherein:

the tin-based catalyst and the phosphinite-based cocatalyst are included in a molar ratio of 1:0.1 to 1:5.

8. The method of claim 1, wherein:

the tin-based catalyst is included in an amount of 0.001 mol % to 0.05 mol % based on the lactide content.

9. The method of claim 1, wherein:

the phosphinite-based cocatalyst is included in an amount of 0.001 mol % to 0.05 mol % based on the lactide content.

10. The method of claim 1, wherein:

the ring-opening polymerization is performed at 150 °C to 200 °C and 0.5 bar to 2 bar for 30 minutes to 6 hours.

11. The method of claim 1, wherein:

the polylactic acid polymer has a weight average molecular weight of 400,000 to 600,000.

* * * * *